(No Model.)

T. DUNCAN.
UNIVERSAL PHASE ALTERNATE CURRENT MOTOR.

No. 518,310. Patented Apr. 17, 1894.

WITNESSES:

INVENTOR:
Thomas Duncan
BY
Chapin & Denny
his ATTORNEYS.

(No Model.) 5 Sheets—Sheet 3.

T. DUNCAN.
UNIVERSAL PHASE ALTERNATE CURRENT MOTOR.

No. 518,310. Patented Apr. 17, 1894.

WITNESSES:
Walter G. Burns.
John J. Muir

INVENTOR
Thomas Duncan
BY
Chapin & Denny
his ATTORNEYS (No Model.) 5 Sheets—Sheet 4.

T. DUNCAN.
UNIVERSAL PHASE ALTERNATE CURRENT MOTOR.

No. 518,310. Patented Apr. 17, 1894.

WITNESSES:
Walter G. Burns
John J. Muir

INVENTOR:
Thomas Duncan
BY
Chapin & Denny
his ATTORNEYS.

Fig. 15
Fig. 16
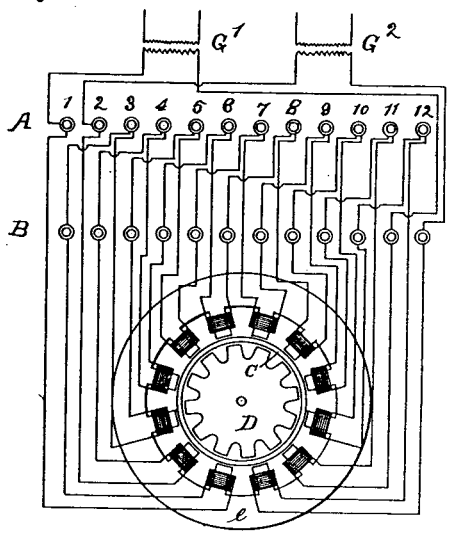
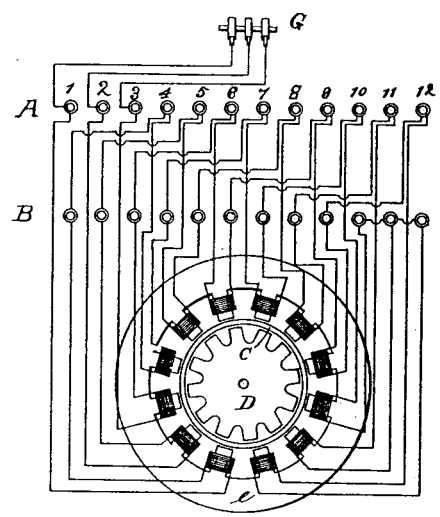
Fig. 17
Fig. 18
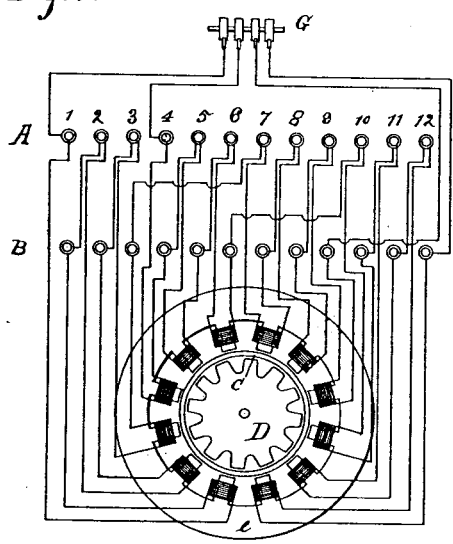
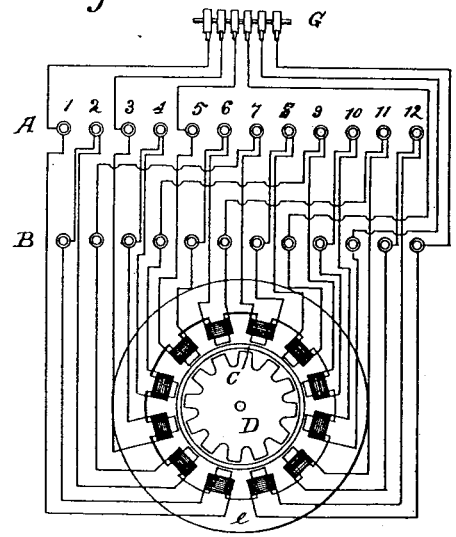

UNITED STATES PATENT OFFICE.

THOMAS DUNCAN, OF FORT WAYNE, INDIANA.

UNIVERSAL-PHASE ALTERNATE-CURRENT MOTOR.

SPECIFICATION forming part of Letters Patent No. 518,310, dated April 17, 1894.

Application filed May 22, 1893. Serial No. 475,087. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Universal-Phase Alternating-Current Motors; and I do hereby declare that the following is a full, clear, and exact description of the invention, which will enable others skilled in the art to which it appertains to make and use the same, reference being had to the accompanying drawings, which form part of this specification.

My invention relates to improvements in universal phase alternating current motors.

The object of my invention is the production of a universal phase alternating current motor which will be self starting and will operate with alternating currents of any phase either simple or single phase or multiphase currents of two, three, four, six or more phases, without the use of a commutator, brushes, or other current rectifying or changing devices, and which will be capable of giving any speed and adapted for rotation in either direction.

I am aware that alternating current motors without commutators have been invented, but such motors are applicable only to some one class of currents for which they are intended, and are known either as single phase motors, or multiphase current motors. In the first of these or single phase current type, rotation of the armature is produced by the resulting action of two currents or fields differing in phase by ninety degrees and known as magnetic lag motors, or motors whose rotation is due to the progressive shifting of said currents or field. Again, in others of this type, the current is divided into two or more parts or circuits, some having iron or its equivalent placed within them to produce the necessary lagging or difference of phase between them, in order to produce rotation of the armature, while others require a special or auxiliary starting device.

The universal phase motor herein described operates upon an entirely different principle when connected or supplied with an ordinary alternating or single phase current namely, upon the repulsive force displayed between a primary coil or field and its secondary, fully set forth and described in other applications filed by me for electricity meters, as follows: Serial No. 415,825, filed December 21, 1891, Serial No. 444,962, filed September 3, 1892, and Serial No. 448,310, filed October 10, 1892. In the second or multiphase current type of motors, rotation is produced by the action of the revolving poles or progressive shifting of the magnetic field upon the armature in a manner now well understood by those skilled in the art.

In this invention I have shown and described a universal phase motor by means of which when connected to a multiphase current system of supply, its out-put is made more efficient by the addition of a second torque producing force working in conjunction with the revolving or rotating magnetic field, namely, the repulsive force before mentioned in conjunction with its operation on single phase currents.

The principal elements employed in the construction of my invention are, first, an armature or cylindrical secondary of low resistance; second, a laminated field magnet having polar projections with coils wound thereon to receive impulses of current from the source of supply; third, an adjustable magnetic path diverter; fourth, a worm gear attachment for altering the position of the diverter as related to the polar projections of the field, for varying the speed and direction of rotation; fifth, a suitable terminal or switch board for making the various connections when changing from currents of one phase to another.

My invention in the best and most practical form of which I am at present aware, is illustrated in the accompanying drawings forming part of this specification, in which similar letters and numerals of reference indicate corresponding parts in the several views.

Figure 1 is an end elevation of a six pole motor for one, two, three or six phase currents. Fig. 2 is a front elevation of the same. Figs. 3, 4, 5, 6, and 7 represent details of a three pole motor for use on either single or three phase current systems. Figs. 8, 9, and 10 are details of a four pole motor to be used in connection with either single phase, two phase and four or quarter phase currents Figs. 11, 12, and 13 show a motor with six poles which can be used with single phase, two phase, three phase and six phase current systems of distribution. Figs. 14, 15, 16, 17, and 18 are twelve pole motors showing the various modes of connecting the field coils to operate with either single phase, two phase, three phase, four or quarter phase and six phase currents.

Referring now to the drawings, A and B each represent a row of terminals to which the field coils are connected.

C is a cylindrical armature or secondary of copper or other electric conducting metal.

D is a laminated iron or steel diverter, adjustable within the armature C for varying the angle at which the lines of force emanating from the field poles shall cut through the armature C, thereby determining the speed and direction of rotation.

The letter $e$ represents the laminated field core, and P is also a laminated iron core. Shown in Fig. 5.

G, G', G$^2$, are generators for supplying the necessary currents.

E represents cast metal frames for holding or clamping the iron laminæ of the field magnet $e$ together, as seen in Figs. 1 and 2.

F represents the bearing heads secured to C and revolving therewith upon the adjustable spindle or shaft S, and to which the pulley U is also attached.

W shows the bearing and K the standards which support the shaft S, the pulley U, the bearing heads F, the armature C and the adjusting lever J, H. L represents the toothed part of the said lever which meshes with the worm M, operated by means of the hand wheel N.

P represents the base which is provided with the lugs R; to this base is also attached the terminal or switch board V.

The numbers 1 to 6 inclusive represent the field coils which have their respective terminals carried by means of the cable T through the insulated bushing $t$ to the corresponding terminal numbers on the switch board V.

The mode of operation of my universal phase alternating current motor, above described, is as follows: The cylindrical armature C occupies the relation of a secondary of low resistance toward the primary coils wound upon the polar projections of the field core $e$, (these coils being marked 1, 2, 3, 4, 5, and 6 in Fig. 1,) and is repelled therefrom. In order to produce this repulsion it becomes necessary that the lines of force emanating from these coils or poles shall cut or encounter the armature at an angle or tangent, hence I use the diverter D for accomplishing this result. By turning the hand wheel N, as seen in Fig. 1, the diverter may be moved to either side of the adjacent pole or coil facing it, thereby changing the direction of rotation. This direction of rotation will be the same as that in which the said diverter was moved and as shown by the arrows in the several views.

When the poles of the diverter are in line with the field poles no motion will take place, because the repulsion between the said field coils and the armature C will be in a line passing through the center or axis of rotation. But as soon as the diverter D is moved to either side of this center rotation will take place. The diverter D as seen in Fig. 1 is secured to the spindle or adjusting shaft S, as is also the adjusting lever J, H. The armature or revolving part C is carried between the poles of the field core $e$ and the diverter D by means of the bearing heads F which are made to revolve upon the adjusting shaft S as shown in Fig. 2. I have also extended the bearing head which carries the pulley U so that it passes through the bearing W, when the pulley or a fan can be fastened on the outside of said bearing. The two terminals of each coil on the field poles are connected to the two corresponding terminal numbers of the switch board V. For instance, the two ends of the field coil marked 1 in Fig. 1, are connected to 1, of the terminals A and B; the No. 2 coil has its terminals connected to 2, of the terminals A and B; the others being arranged in a similar manner. The field coil terminals are all carried through the cable T into the base of the motor as shown. If a single phase current be used to operate the motor the terminals A may be all plugged or joined together and connected to one side or terminal of the supply circuit, while all the terminals B are joined in the same manner to the other or remaining side of the system. By connecting them in this way the field coils will all be in multiple or parallel arc. If it is desirous to connect them in series, they may be so arranged by connecting B', to A$^2$, B$^2$ to A$^3$, B$^3$ to A$^4$, B$^4$ to A$^5$, B$^5$ to A$^6$, then connecting the remaining terminals, viz. A' and B$^6$ to the two sides of the system respectively. This method of connecting is shown in Fig. 11. If used with three phase currents connect as shown in Fig. 12 and if used for six phase connect them as shown in Fig. 13.

In Fig. 3 is shown a three pole motor adapted for either single phase or three phase currents. As shown it is connected to a single phase generator G and has its field poles facing the armature C at an angle or tangent. This arrangement of the poles causes the lines of force to cut the cylinder C obliquely or at an angle which produces rotation by its being repelled therefrom. It also makes it operative without the use of a diverter. Its field coils are in series as shown by plugging 1$^B$ to 2$^A$, 2$^B$ to 3$^A$ and connecting the remaining terminals 1$^A$ and 3$^B$ to the generator or source of supply.

In Fig. 4 is shown the same motor with its field connections changed and supplied with a three phase current from the generator G. In these connections the generator or line terminals are plugged to the three upper or row A of posts marked 1, 2, and 3, while the remaining or lower row marked B are all joined together. These connections may be reversed since the generator G may be connected to the row B, then the row A joined or plugged together.

Fig. 5 is the same as Fig. 3 with the addition of the laminated iron core placed within the armature or cylinder C. This core may be made stationary within the armature C or it may be fastened to and revolve with it. Its purpose is to decrease the magnetic resistance between the poles, thereby increasing its efficiency.

Fig. 6 shows a three pole diverter for varying the speed. The said diverter poles may also be wound with a coil and connected to the same source of supply, as illustrated and fully described in Letters Patent issued to me July 4, 1893, Nos. 500,868 and 501,000.

Fig. 7 shows another modification in that the field poles face the center or axis of rotation. The connections being similar to those seen in Fig. 4 for triphase currents. The lower left hand coil is taken as No. 1 in all the several views, the numbering being made in the direction of the hands of a watch, as shown in Fig. 1. For three phase currents, as shown in Figs. 4 and 7, the three wires or circuits leading from the generator G are connected to the three terminals 1, 2 and 3 of the row A, while the remaining three, viz., 1, 2 and 3 of the row B are connected together.

Fig. 8 shows a four pole motor with its field coils connected in series to a single phase generator. This form is also operative without a diverter, since the angle at which the poles are set against the armature produce the necessary tangential thrust or repulsion. An iron core may also be employed, as shown in Fig. 5, or a diverter may be used which will add considerably to the efficiency of the said repelling force.

Fig. 9 shows a two phase combination by plugging the two sets of field coils which are diametrically opposite, in series and connecting their two remaining terminals to the two transformers G' and G², respectively, as shown. The said transformers supply currents to their respective coils at different time periods varying by a quarter period or ninety degrees. This combination clearly shows how the two forces, before mentioned, work conjointly in producing rotation of the armature, in that said armature is repelled from the field poles due to the action of the diverter which causes the magnetic flux to cut it at an angle, and the action of the revolving multimagnetic field carrying it in the same direction.

Fig. 10 shows the same motor connected to a four phase generator G. If used with single phase or ordinary alternating currents, connect all the field coils in series, as shown in Fig. 8, or they may be connected in parallel arc.

Fig. 11 represents a six pole motor which may be used in connection with single phase, two phase, three phase, or six phase currents. The connections shown are for single phase currents, the field coils being in series. If used with two phase currents I connect each set of these coils one hundred and twenty degrees apart in series or multiple, and then join the two remaining terminals of each set to the two phase source of supply, as shown at G', and G² in Fig. 9. The connections above mentioned will be easily understood by those skilled in the art.

Fig. 15 shows the method of connecting for operation with two phase currents. Fig. 16 shows it connected to a three or tri-phase system.

Fig. 17 shows the method of connecting the fields for four or quarter phase systems.

Fig. 18 represents the connections used when operated with six phase currents. In the case of a twelve phase connection with twelve poles, each coil will be connected with the one diametrically opposite, thereby having six sets of coils, consisting of two each, and twelve remaining terminals which are connected to the twelve phase generator.

I do not hereby limit myself to the connections given, as other methods of connecting are applicable and well known.

My improved motor will still be operative if, from any fault or accident in the other circuits, only one of them be in operation or supplying current to its respective field coil or magnets, when used with any multiphase current, which can not be accomplished by any other known motor.

In a motor of this construction, the possibility of burning out is entirely eliminated. I have also used a cylinder of iron instead of copper; and I have constructed an armature by combining these two and in placing the iron cylinder within the copper one, both being secured to each other and revolving together.

In constructing the copper cylinder I have also made some with slots or holes cut through the surface to provide a more defined course or path for the secondary currents to flow, these slots or holes preferably being of the same number as the field coils or poles. The said slots or holes may also be made of the same size or area as the face of the pole pieces; and good results may be obtained by using an iron cylinder within these slotted secondary cylinders, both being insulated from each other.

Figs. 7, 9, 10, 11, 12, 13, 14, 15, 16, 17, and 18 are all shown as having radial pole pieces or magnets, but they may also be made to face the armature at an angle, as shown in Figs. 3, 4, 5, 6, and 8.

Figure 1:
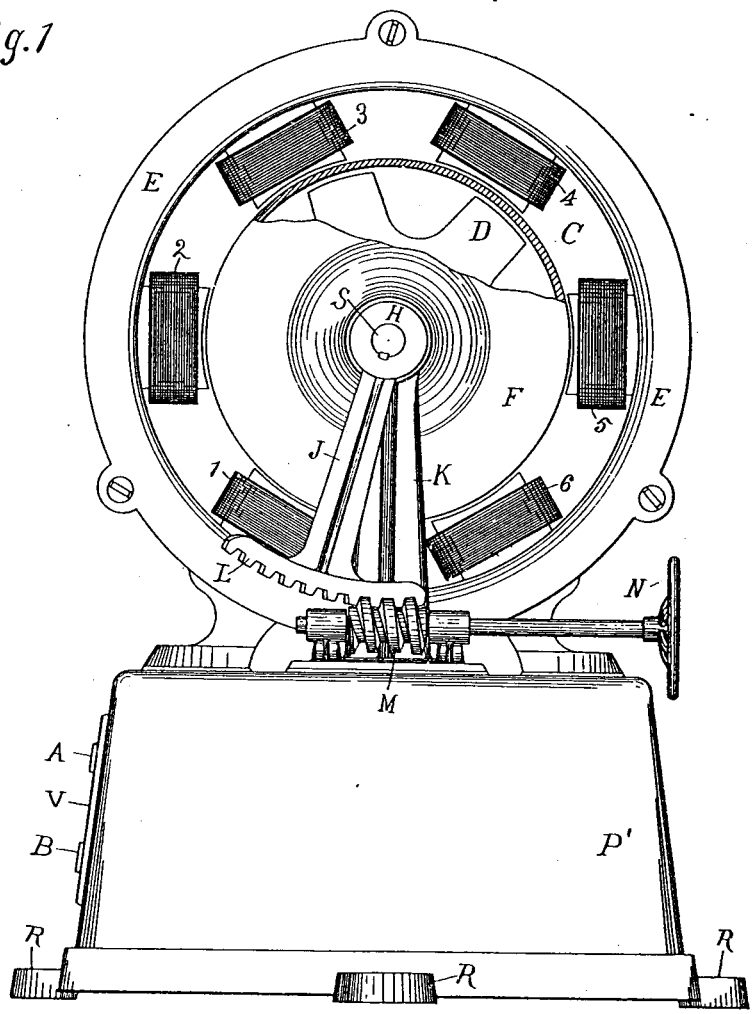
Figure 2:
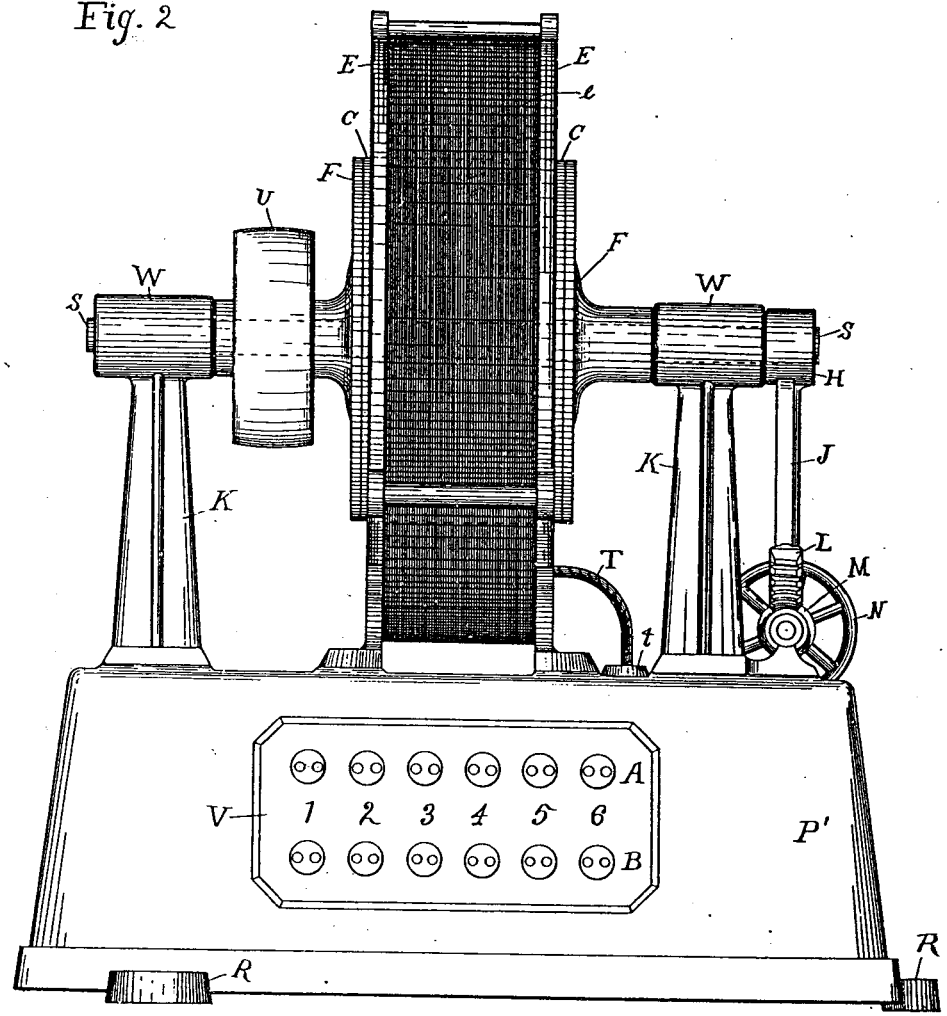
Figure 3:
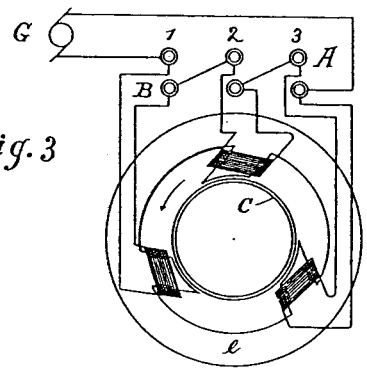
Figure 4:
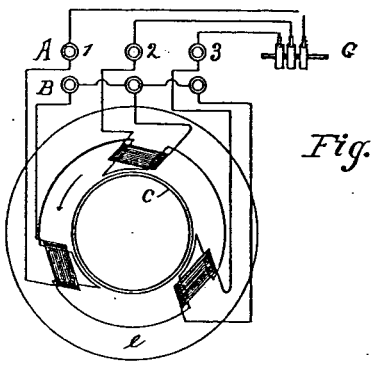
Figure 5:
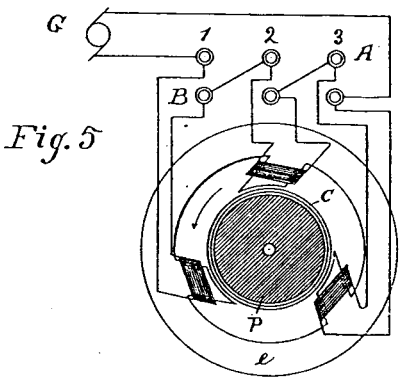
Figure 6:
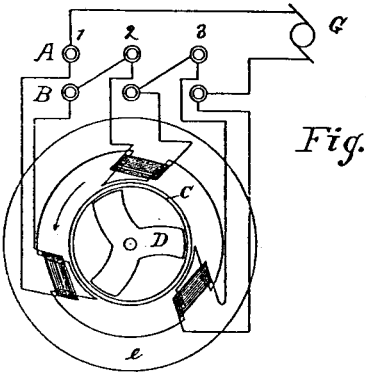
Figure 7:
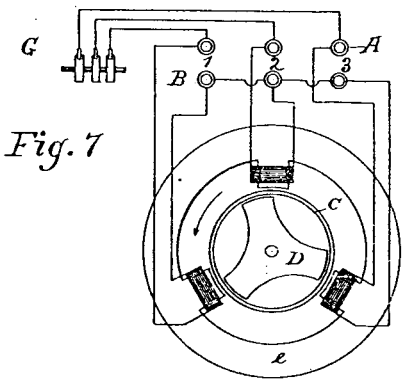
Figure 8:
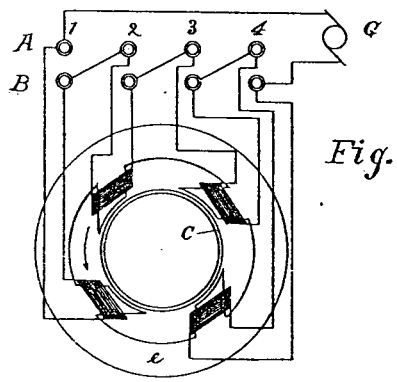
Figure 9:
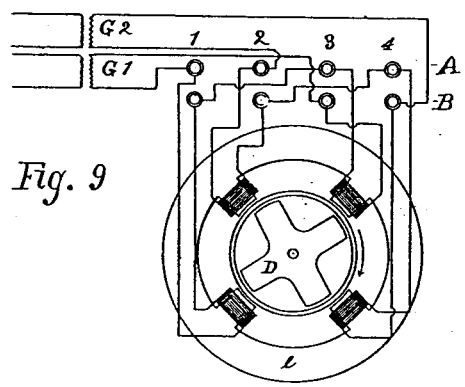
Figure 10:
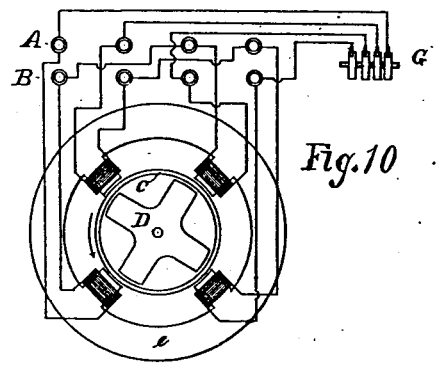
Figure 11:
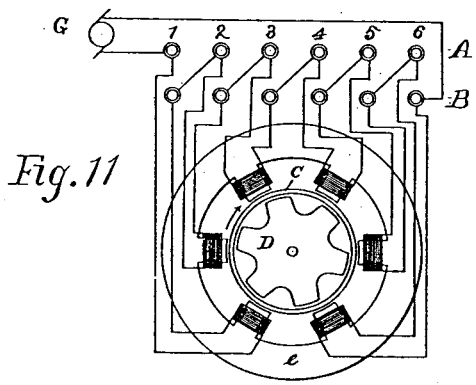
Figure 12:
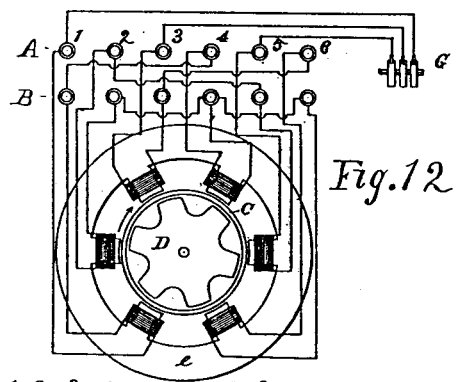
Fig. 12 shows the same six pole motor with its field coils suitably arranged or connected for use with a three phase current system of distribution.
Figure 13:
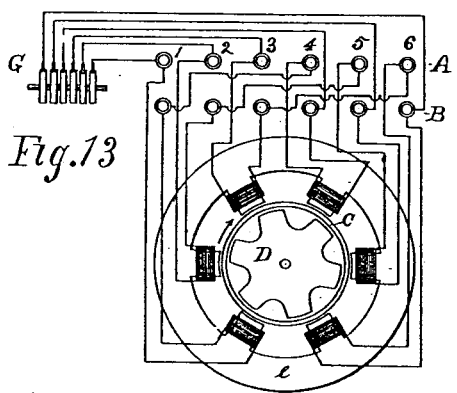
Fig. 13 shows the connections for use with a six phase current system, and connected to the six phase current generator G.
Figure 14:
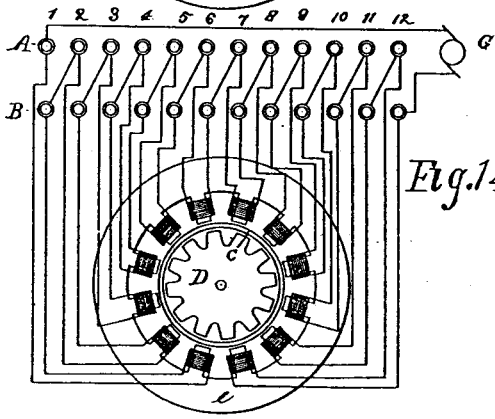
Fig. 14 represents a twelve pole motor which may be operated with single phase, two phase, three phase, four phase, six phase or twelve phase currents. The connections shown are for single phase currents, the coils all being in series with each other.

In a motor for using only single or two phase currents I can employ two field coils or magnets by connecting them in series or multiple for single phase currents, and for two phase currents, by connecting each field or coil to one of the two phase current circuits respectively, as shown at G', and G², in Figs. 9 and 15. By increasing the number of poles of the motor it will operate with any increased number of multiphase currents. Inasmuch as at the present time the greatest number of phases used in commercial operation is the four or quarter phase, a twelve pole motor meets all the requirements thereof, and also for the three phase, the two phase and the single phase.

I do not hereby limit myself to any particular construction of this form of motor, as the same principles of action or operation may be carried out in a great variety of forms.

My improved motor is capable of various useful applications not necessary here to describe, it being sufficient to say that its adaptability and flexibility for multiphase and single phase currents being a novel feature of the highest value, besides being cheap, simple, reliable and easy to maintain.

It is believed that my invention is the first universal phase alternating current motive device which can be used for any practical purpose, and which is adapted to operate with either ordinary alternating or single phase currents, two or di-phase currents, three or tri-phase currents, four or quarter phase currents and six or more currents differing in phase by any number of degrees. It is further believed that I am the first to impart directly by means of a multiphase current a second power or turning force, working in conjunction with the torque of the rotary or multi-magnetic field, it being the repulsive force exerted upon the armature by its being blown or thrust away from the pole pieces or coils which energize them and in the direction of the revolving field. This repulsive force may be utilized to vary the speed of the motor by moving the diverter toward or a little past its adjacent field magnet pole or coil in the opposite direction to that in which the revolving or multi-magnetic field is traveling. For instance in Fig. 10 if the diverter D be moved in a direction opposite to that of the arrow, or be made to occupy the position shown in Fig. 9 it will tend to retard or stop the motion, on account of its working in opposition to the rotary fields, they being also in the direction of the arrow.

Having thus particularly described and ascertained the nature of my invention and the manner of using the same, what I claim, and desire to secure by Letters Patent, is—

1. In an alternating current electro magnetic motive device, the combination of a laminated field having its polar projections facing inward at an angle, as shown, and a closed secondary or armature, all substantially as set forth and described.

2. In a universal phase motor, the combination of a laminated iron field having polar projections with suitable coils wound thereon for the purpose set forth, a closed armature of low resistance and a magnetic path diverter for regulating the direction of the magnetic flux through the armature, substantially as described.

3. The combination in an electro-magnetic motor for single or multiphase alternating currents, of a field magnet adapted to be connected with said currents, a closed rotary armature, a magnetic path diverter and the adjusting lever all substantially as and for the purpose set forth.

4. In a universal phase alternating current motor, the combination of an energizing field magnet e, a closed cylindrical secondary or armature C, the bearing heads F supporting said armature, and the adjusting shaft S on which the said mandrel heads are adapted to rotate, all substantially as described.

5. In a universal phase motor, the combination of the field magnet e, the armature C, the bearing heads F, the diverter D, the lever J. H L, the worm gear M, the adjusting shaft S, and the plug or switch board V, all as described and hereinbefore set forth.

6. In an electric motor for single and polyphase currents, the combination of a laminated field having its polar projections facing the armature at an angle, and provided with suitable coils located in the circuit or circuits of the supply, and a laminated diverter for varying the speed and direction of rotation, all substantially as described.

7. In an electric motor for single and polyphase currents the combination of a laminated field having its polar projections facing the armature at an angle, and provided with suitable coils located in the circuit or circuits of the supply, a laminated diverter for varying the speed and direction of rotation and the terminals plugs or switch board as herein set forth and described.

Signed by me, at Fort Wayne, Indiana, this 18th day of May, 1893.

THOMAS DUNCAN.

Witnesses:
R. S. ROBERTSON,
WALTER G. BURNS.